United States Patent
Monjo

[11] Patent Number: 5,963,133
[45] Date of Patent: Oct. 5, 1999

[54] ELECTRONIC TAG

[76] Inventor: Nicolas Monjo, 512 E. 88th St., New York, N.Y. 10128

[21] Appl. No.: 08/896,691

[22] Filed: Jul. 18, 1997

[51] Int. Cl.[6] .................................................. G08B 13/14
[52] U.S. Cl. ...................... 340/572.1; 235/385; 340/331; 340/572.8; 340/692; 340/825.35; 705/20; 705/28
[58] Field of Search ..................... 340/572, 568, 340/825.35, 825.49, 692, 691, 331, 332, 309.15, 572.1, 572.8, 568.1; 235/385, 383; 705/28, 22, 23, 20

[56] References Cited

U.S. PATENT DOCUMENTS

| | | | |
|---|---|---|---|
| 4,698,620 | 10/1987 | Marshall | 340/568 |
| 5,045,327 | 9/1991 | Tarlow | 381/51 |
| 5,151,684 | 9/1992 | Johnsen | 340/572 |
| 5,245,534 | 9/1993 | Waterhouse | 364/404 |
| 5,295,064 | 3/1994 | Malec et al. | 340/825.35 X |
| 5,365,494 | 11/1994 | Lynch | 368/10 |
| 5,406,024 | 4/1995 | Kazuaki | 84/622 |
| 5,410,962 | 5/1995 | Collier | 101/375 |
| 5,463,369 | 10/1995 | Lamping | 280/808 |
| 5,537,126 | 7/1996 | Kayser et al. | 340/825.35 X |
| 5,710,540 | 1/1998 | Clement et al. | 340/572 |

FOREIGN PATENT DOCUMENTS 2257278  1/1993  United Kingdom ................... 340/572

*Primary Examiner*—Thomas Mullen
*Attorney, Agent, or Firm*—William D. Schmidt

[57] ABSTRACT

An electronic tag comprising a controller having a microprocessor, RAM, ROM, line drivers and receivers to interface with a main computer terminal. The electronic tag also has a plurality of switches that are connected to the controller so as to allow the input of data. Data may include selling price, description of the item, designer or brand name. Part of the data may be displayed on a display that is connected to the controller. The tag may be equipped with a receiver so that it may receive signals from another location that is connected to a micro-converter that converts the signals into a format recognized by the controller. A transmitter may also be connected to the controller so that information may be transferred from the controller to another location in the system.

8 Claims, 3 Drawing Sheets

ELECTRONIC TAG

FIELD OF THE INVENTION

This invention relates to a communication device that has a display. In particular, this invention relates to a communication device that has computer processing capabilities, is capable of transmitting and receiving radio signals, and is capable of displaying information.

BACKGROUND OF THE INVENTION

Retailers in recent years have been looking for devices to make pricing of merchandise easier and faster. Currently retailers manually mark each and every item. These marks are either done on the items themselves or on tags which display the price, size and any other information important to the consumer. Frequently, the price of items in the retail market are reduced when they are not sold fast enough. When this occurs the merchant must manually reprice the items by either crossing out the old price and writing in the new price, or placing stickers with adjusted price over the old price. Either way pricing items using this method is time consuming, inefficient and expensive.

Recent attempts have been made to use electronic systems in order to replace manual pricing. One example, uses a bar code scanning device to replace manual pricing. This device uses the bar code that is already on the item to identify the item to a computer terminal. When the bar code is scanned into the scanning device a computer matches the item with the price imputed into the computer for that item. Since the bar code for that item remains the same, regardless of the changes made to the prices the retailer need only input the new price into the computer so that when the item is scanned into the computer the new price will be charged.

Although this procedure is more efficient than manually pricing the items it still has many problems. One major problem with this system is that the price is not displayed on the item itself. Therefore, the consumer is often unaware of the price of the item. To counter this problem the retailer often resorts to manually pricing some of the items and/or using signs to report the price of the others. Therefore, even when using this system the retailer must resort back to the inefficient, time consuming and expensive method of manually pricing.

Another example of an electronic pricing system uses one or more data buses together with a central computer to communicate with one or more price tags located in the store. Each price tag can also have a liquid display to display the price. The tags are then snapped into place on rails, each store shelf having a rail. Each rail has several conductors attached to them so that the tag can be placed almost anywhere along the rail. The rails are then tied together to communicate with a processor.

Although this system may be more convenient than manually pricing items it too has its problems. This system is designed to work with retail items that are sold from a shelf, like the items sold in a grocery store. However, the majority of garments sold in retail stores today are not sold from shelves, but are sold from hangers. Therefore, the above mentioned system can not be used by most cloth retailers, where repricing of garments may take place several times before an item is sold.

Another problem with this system is that it does not take into account the miss-shelving of items. If a consumer returns an item to the wrong shelf, the price and the item would not match up. Moreover, since the position on the rail is indistinguishable, from the point of view of the processor and/or controller, from any hundreds or thousands of other rails, if the tag was removed from the rail and placed on another rail the processor would be unable to detect the misplacement.

In view of these problems, the above mentioned pricing system would probably not be useful for clothing retailers.

Many attempts have been made to adapt the above system for use in the clothing industry. One such device places the rails used above on gondolas that are used to hold clothes. The processor then communicates with the gondola in the same way in which it communicated with the shelf. Each gondola has a so-called controller connected with the rails of the gondola, and the controllers communicate directly with the processor.

Although this system is adapted for use with items that are sold from hangers instead of shelves it still has all of the problems discussed above that are associated with the device used on shelves. This item also limits the way in which the retailers display the clothes to the consumer since all items on the gondola must be the same. Often in the clothing industry retailing coordinates are grouped together on the same gondola in order to help the consumer in purchasing items that are designed to be worn together. Since presentation of garments is extremely important in selling the item, this limitation can be devastating to the retailer.

Therefore there is a need for an electronic system that is accurate, easy to use and does not limit the way in which the retailer wants to present the goods to the consumer.

SUMMARY OF THE INVENTION

With the objectives described above, an electronic tag comprising a controller having a microprocessor, RAM, ROM, line drivers and receivers so that it is capable of interfacing with a multiplicity of connections is disclosed. The electronic tag may be equipped with a plurality of switches that are used for imputing data and are connected to the controller. Such data may include the selling price of the item, a description of the item, the designer or brand name, or/and any other information that is entered into the system.

The electronic tag may comprise a display screen, typically a liquid crystal display (LCD). Part of the imputed data may be displayed on a display screen or stored in the microprocessor of the computer for later use. In addition, the tag may be equipped with a receiver so that it may receive signals from another location. The receiver is connected to a micro-converter that converts the signals received into a format that is recognized by the controller. This allows the user to communicate with the electronic tags via radio signals. Thus, the user may send information concerning the item encrypted in a radio signal.

The electronic tag may also contain a transmitter that is connected to the controller so that information may be transferred between the electronic tag and the controller. Therefore, a signal can be sent to the electronic tag by the controller, received by the tag, processed and requested data sent back to the controller by the transmitter. The controller may then use this data for inventory purposes, price changes, statistics gathering or the like. This would allow a store personnel to quickly take inventory, markdown prices or locate a particular item just by sending out a signal from the controller so that the electronic tag may respond. This can save money since changing prices or taking inventory using the electronic tag system will be more efficient and therefore reduce the amount of money spent on payroll.

In addition, the electronic tag may also come equipped with an electronic connection point so that direct communication between said electronic tag and a hand held processor may be used.

In another embodiment, the electronic tag may also comprise a temporary storing means for recording sound, a miniature self-contained sound-playback module and a means for transferring the recorded sound from the temporary storing means to the miniature self-contained sound-playback module.

The miniature self-contained sound-playback module comprises a digital memory for storing information in the digital form. The digital memory may be activated in order to generate a digital output signal that corresponds to the stored data. A digital-to-digital converter is connected to the memory for converting the digital output signal. The miniature self-contained sound-playback module may also be equipped with a speaker which will be responsive to the digital signal for reproducing the sound.

In still another embodiment the tag is equipped with a security device. The security device can be based on the type currently used in retail stores or may be able to communicate with the central computer once the garment has passed beyond a certain point with the electronic tag still attached.

Finally, the electronic tag comprises an activator means that is controlled by the user of the playback module to activate the memory in order to produce the digital output signal. Once the digital output signal is produced the speaker means produces the sound as recorded by the recording apparatus.

DETAILED DESCRIPTION OF THE INVENTION

Figure 1:
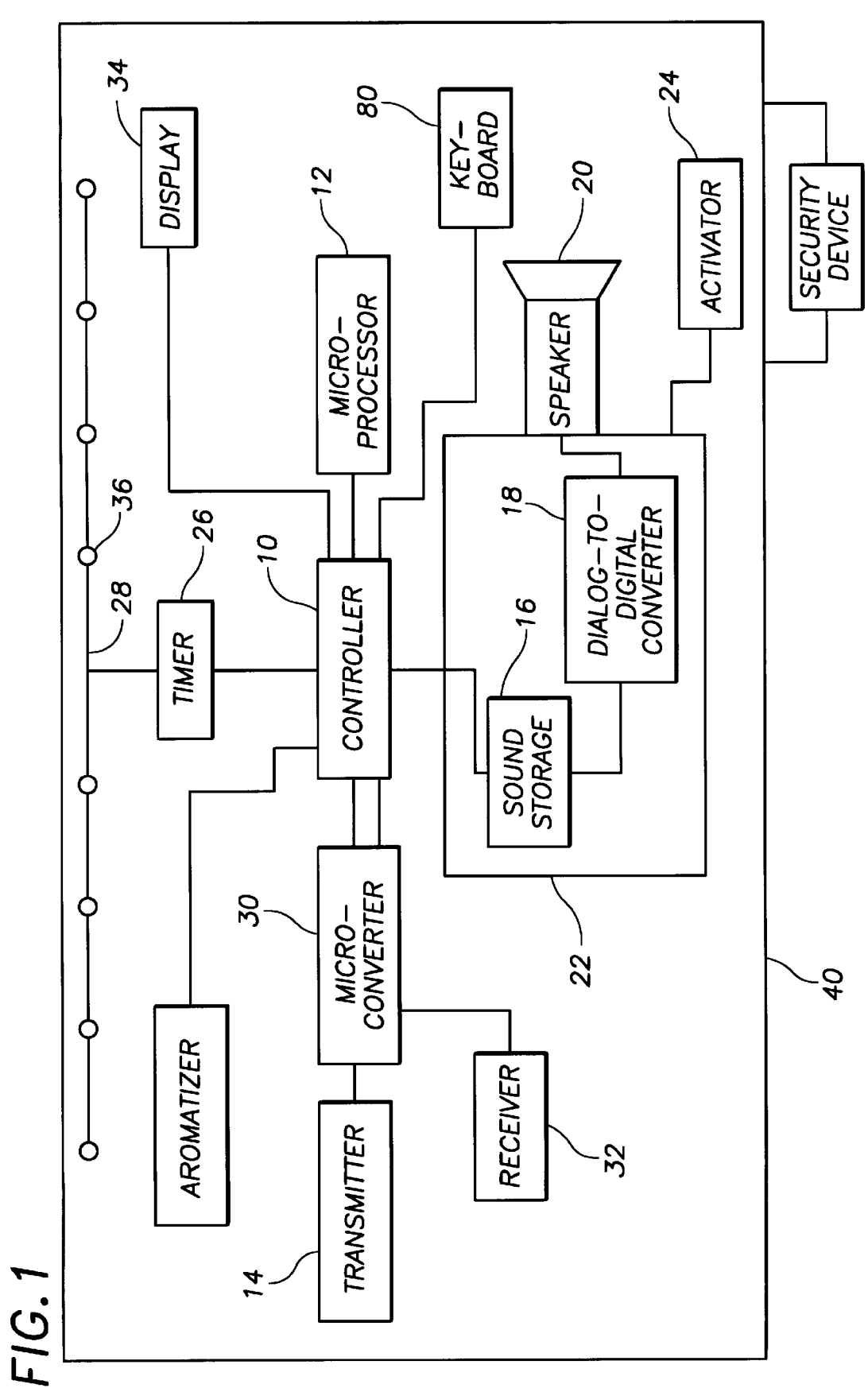
FIG. 1 is a functional block diagram of an electronic tag, showing a micro-processor, controllers and other functional components.

FIG. 1 shows a functional block diagram of an electronic tag 40. The electronic tag 40 has a controller 10 that is connected to a multiplicity of different functional components of the electronic tag 40. The controller 10 receives information from the various components of the electronic tag 40 and is able to store and transfer signals to the various parts of the electronic tag 40. The controller 10 is connected to a microprocessor 12 that has random access memory (RAM) and random operating memory (ROM).

The microprocessor 12 runs a stored program, preferably written in the assembly language of the microprocessor. The electronic tag 40 gets its power and ground from a battery (not shown) which it uses to maintain the memory of the microprocessor 12. In a preferred embodiment a backup battery is placed within the electronic tag 40 along with nonvolatile memory. The microprocessor 12 is chosen from any one of a number of inexpensive microprocessors having built-in RAM and ROM so as to minimize the parts count inside the electronic tag 40.

Programming each tag permits the tag to receive information in the form of a bit stream from the various components of the electronic tag 40. Once the microprocessor 12 has evaluated the signal it has received from one or more components of the tag, via the controller 10, it processes the information and sends a response command to the controller 10. The controller 10 responds to the command of the microprocessor 12 by either activating or deactivating the various components of the electronic tag 40.

The various parts of the electronic tag 40 that are connected to the controller 10 include a playback module 22. The play back module 22 may be equipped with an erasable programmable read-only memory. The playback module 22 has sound storage 16 capability that is connected to a dialog-to-digital converter 18 and then to a speaker means 20. Once the proper command is received from the controller 10, the sound storage 16, i.e. a temporary storage means of the playback module 22 sends a signal to the dialog-to-digital converter 18. The digital-to-digital converter 18 converts the recorded sound from the sound storage memory 16 to digital form and either stores the message in digital form in the digital memory or directly sends the sound to the speaker means 20 via a means for transferring the recorded sound where the message is played. The message may include information about the garment or device to which the electronic tag 40 is attached or simply about the manufacturer that makes the garment or device.

In one embodiment the playback module 22 may be activated by pressing an activator 24. Once the activator 24 is pressed the series of events described above are set into action.

Another component of the electronic tag 40 is a receiver 32 that is attached to the controller through a micro-converter 30. The receiver 32 receives outside signals in dialog form. The signals are then converted to digital form by the micro-converter 30. Once in digital form the signals are relayed to the controller 10. The controller 10 then sends the signal to the micro-processor 12 where it is processed and a corresponding command is sent back to the controller 10. The controller 10 is then able to activate or deactivate the particular component of the electronic tag 40 in which the command is directed.

The originating signal may come from a central computer that instructs the electronic tag 40 how to function. For example, the signal received by the receiver 32 may include information about pricing of the garment or device in which the electronic tag 40 is attached.

The electronic tag 40 may be equipped with a transmitter 14. The transmitter 14 is attached to the controller 10 via a micro-converter 30. The micro-converter 30 converts digital signals from the controller into an acceptable format so that the signal can be transmitted from the transmitter 14 to another location. In one embodiment the information is transmitted to a central computer that keeps track of various garments on display in a store or stored in a warehouse. This allows a merchant to take inventory or change prices without ever physically touching the garment.

In another embodiment, the electronic tag 40 may be equipped with a timer 26 that is attached to a series of lamps 36 connected in series by a wire 28. The timer is also connected to the controller 10. The controller may activate the timer 26 by sending a signal. Once activated the timer 26 turns on the series of lamps 36 connected in series by the wire 28. The lamps may be activated to turn on all at one time or to flash in an alternating pattern. This may be used to attract a consumer to a particular garment for sale.

The electronic tag 40 is also equipped with a display screen 34. The display screen 34 may be a conventional liquid crystal display (LCD). The display 34 is attached to the controller 10 where it receives the information to be displayed on the screen.

In one embodiment the electronic tag 40 has a plurality of switches i.e. keyboard 80 that is used to input data. The keyboard is connected to controller 10 and the data keyed into the keyboard 80 may be shown on display screen 34.

In still yet another embodiment of the invention, the electronic tag 40 is equipped with an aromatizer that is designed to release a fragrance. The aromatizer is connected to the controller 10 and may release a fragrance when activated or a fragrance may be released periodically. The fragrance released by the aromatizer may be associated with the garment or device in which the tag 40 is attached. For example, the fragrance released by the aromatizer may have been designed by the same designer of the garment in which the tag 40 is attached. The aromatizer may also release a scent when the electronic tag 40 is moved for a determinable time interval. This is designed to attract the consumers attention and to entice the consumer to purchase the garment as well as the fragrances released.

Figure 2:
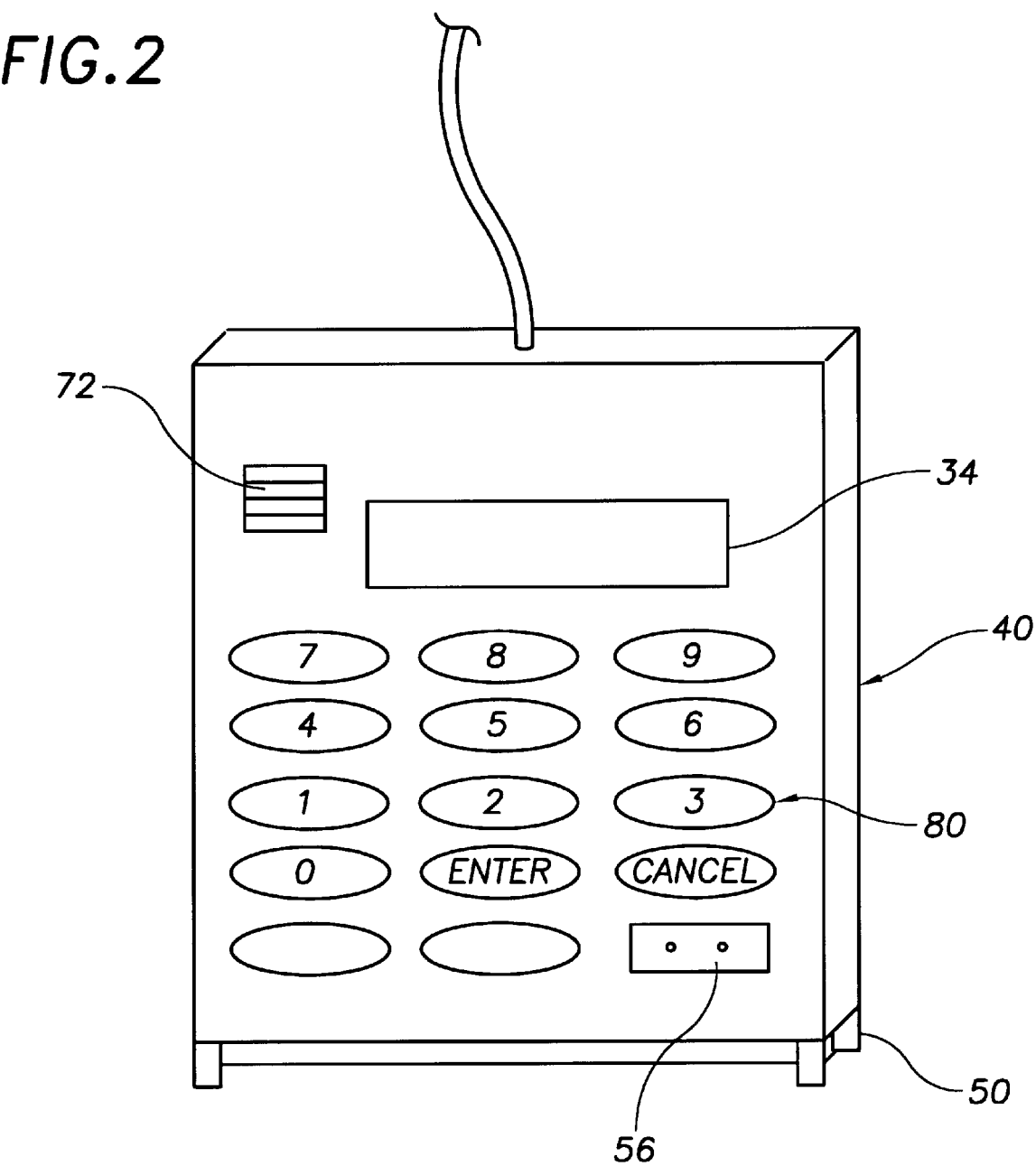
FIG. 2 is a front view showing the external casing of the electronic tag of FIG. 1.

FIG. 2 shows the electronic tag 40 having a multiplicity of prongs 50 on its lower portion. These prongs are used to connect the tag 40 to a hand held device (shown in FIG. 3). The hand held device is used to program the tag 40. The tag 40 also has a plug receptacle 56 that may receive a wire used to recharge the battery of the tag 40 or in the alternative the plug receptacle 56 may be used to attach the electronic tag 40 directly to a central computer. The tag 40 shows the display screen 34 and the keyboard 80 of FIG. 1.

Figure 3:
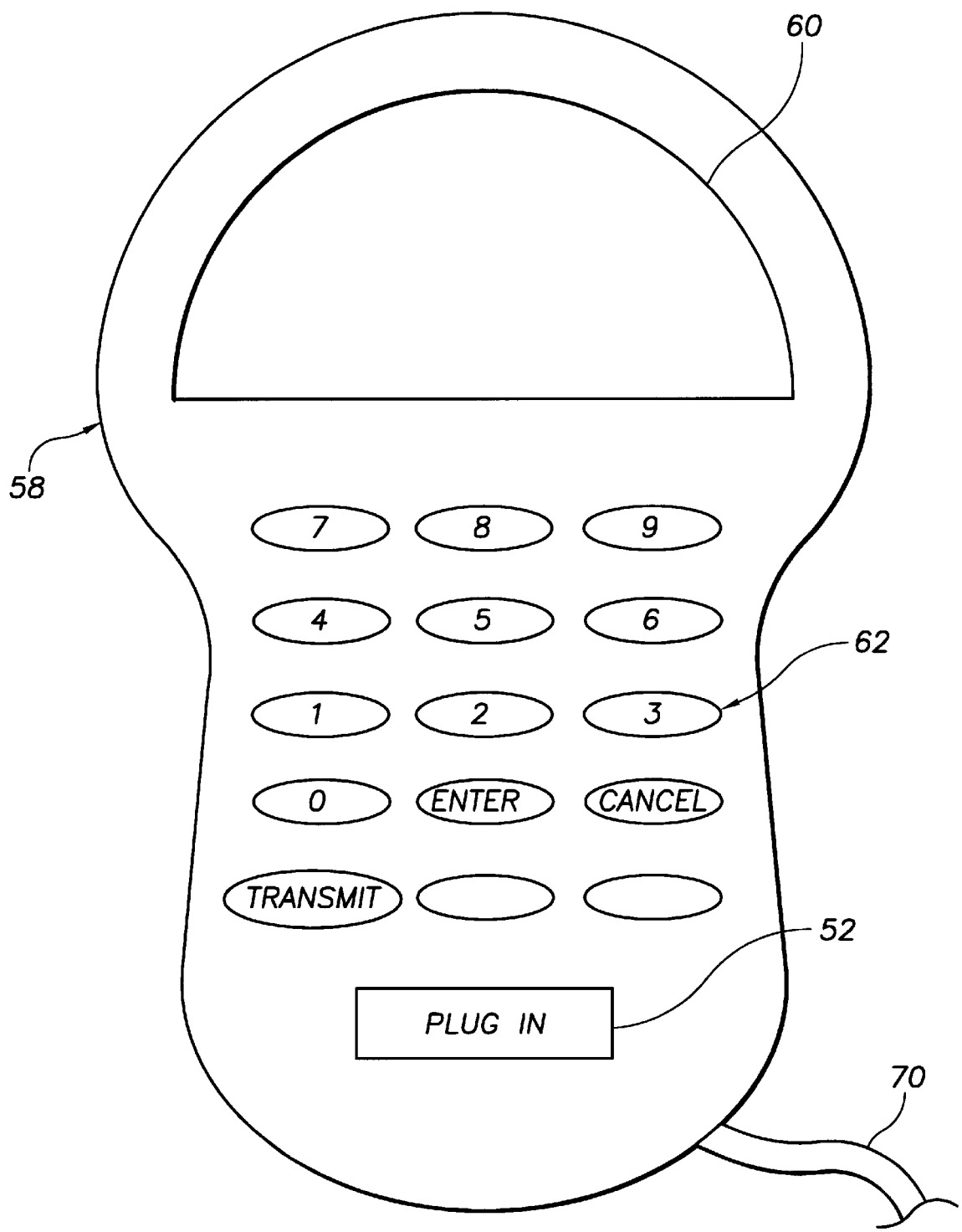
FIG. 3 shows a hand held device in which the tag of FIG. 1 may be inserted and manipulated.

FIG. 3 shows a hand held device 58 having a display screen 60 and a keyboard 62. The display screen 60 may display the input data programmed into the device 60 prior to attaching the electronic tag 40. The tag 40 attaches to the device 60 at the plug receptacle 52. The data to be transferred to the tag 40 may be keyed into the device 62 using keyboard 60. The display may be used to indicate the programmed data prior to transmitting it to the electronic tag 40. The wire 70 may attach the device 60 to a larger central computer.

The electronic tag described above is designed to reduce the amount of time associated with taking inventory and/or changing prices of items equipped with such tags. In addition, the tag can be used to attract the consumer to the garment using smell, lights and sound.

Information may be sent to the electronic tag from a central computer in the form of a signal. The signal is received by the tag via the receiver. The signal is then converted to a digital form and transmitted to the controller. The controller together with the microprocessor evaluates the digital signal and sends a command to the specific component of the tag to be activated or deactivated. For example, when changing the price of the item in which the tag is attached, the signal received by the tag is sent to the controller. The signal is then relayed to the micro-processor that instructs the controller to send a command to the display altering the price shown. Changing prices in this way is faster, more efficient and therefore less expensive for the employer.

Other functions including audio messages, lights, or displayed information may be activated in a similar fashion. For example, the tag may play messages, or music designed to attract the consumer to the product. These messages may be played upon activation of the activator button by the consumer, on a time dependent basis or in response to a command by the controller. Any other suitable way of activation is also possible. The lights, and display system may also be activated in a similar manner.

While the specific preferred embodiments have been described, they are merely exemplary and those skilled in the art will perceive numerous modifications and variations of the embodiments without departure from the spirit and scope of the invention, as defined by the appended claims.

I claim:

1. An electronic tag comprising:

a controller having a microprocessor, Random Access Memory, Random Operating Memory, line drivers and receivers to interface with a multiplicity of connections;

a plurality of switches for imputing data that are connected to said controller;

a display for displaying information, that is connected to said controller;

a receiver for receiving a plurality of signals from another location;

a micro-converter connected to said receiver that converts said signals into a format recognized by said controller, said micro-converter connected to said controller whereby information is received by said receiver, converted into a controller readable form and sent to said controller for processing;

a transmitter, said transmitter connected to said micro-converter, said micro-converter and said controller convert controller readable signals into a transmittable format, whereby said transmitter transmits information from said controller of said electronic tag to another location;

a miniature self-contained sound-playback module connected to said controller, said miniature self-contained sound-playback module comprising a temporary storing means for recording sound, a dialog-to-digital converter for converting the recorded sound into a digital signal, and a speaker means;

said dialog-to-digital converter comprising a digital memory for storing the digital signal, said digital memory being capable of activation to generate a digital output signal corresponding to the stored digital signal, a means for transferring the digital output signal from the dialog-to-digital converter to the speaker means;

said speaker means responsive to the digital output signal for reproducing said sound;

activator means controllable by a user of said playback module to activate said digital memory to produce said digital output signal, thereby causing the speaker means to produce the recorded sound.

2. The electronic tag of claim 1, further comprising a timing means for turning on a plurality of lamps.

3. The electronic tag of claim 2, wherein said lamps are light-emitting diodes.

4. The electronic tag of claim 2, wherein said timing means turns on said plurality of lamps at one time or flashes said lamps in an alternating pattern.

5. The electronic tag of claim 1 wherein a means for playing back said sound as recorded by the temporary storage means comprises a playback control button further comprising indicator means for indicating activation of the playback control button.

6. The electronic tag of claim 1 wherein a digital playback in said module comprises an erasable programmable read-only memory.

7. The electronic tag of claim 1, further comprising:

a security device that is actuable by a security actuating device.

8. The electronic tag of claim 1 further comprising an aromatizer that releases a scent.

* * * * *